Feb. 4, 1958 R. E. RISLEY ET AL 2,822,191
PIPE COUPLING WITH PIPE ENGAGING PIVOT LUGS
Filed July 11, 1952 3 Sheets-Sheet 1
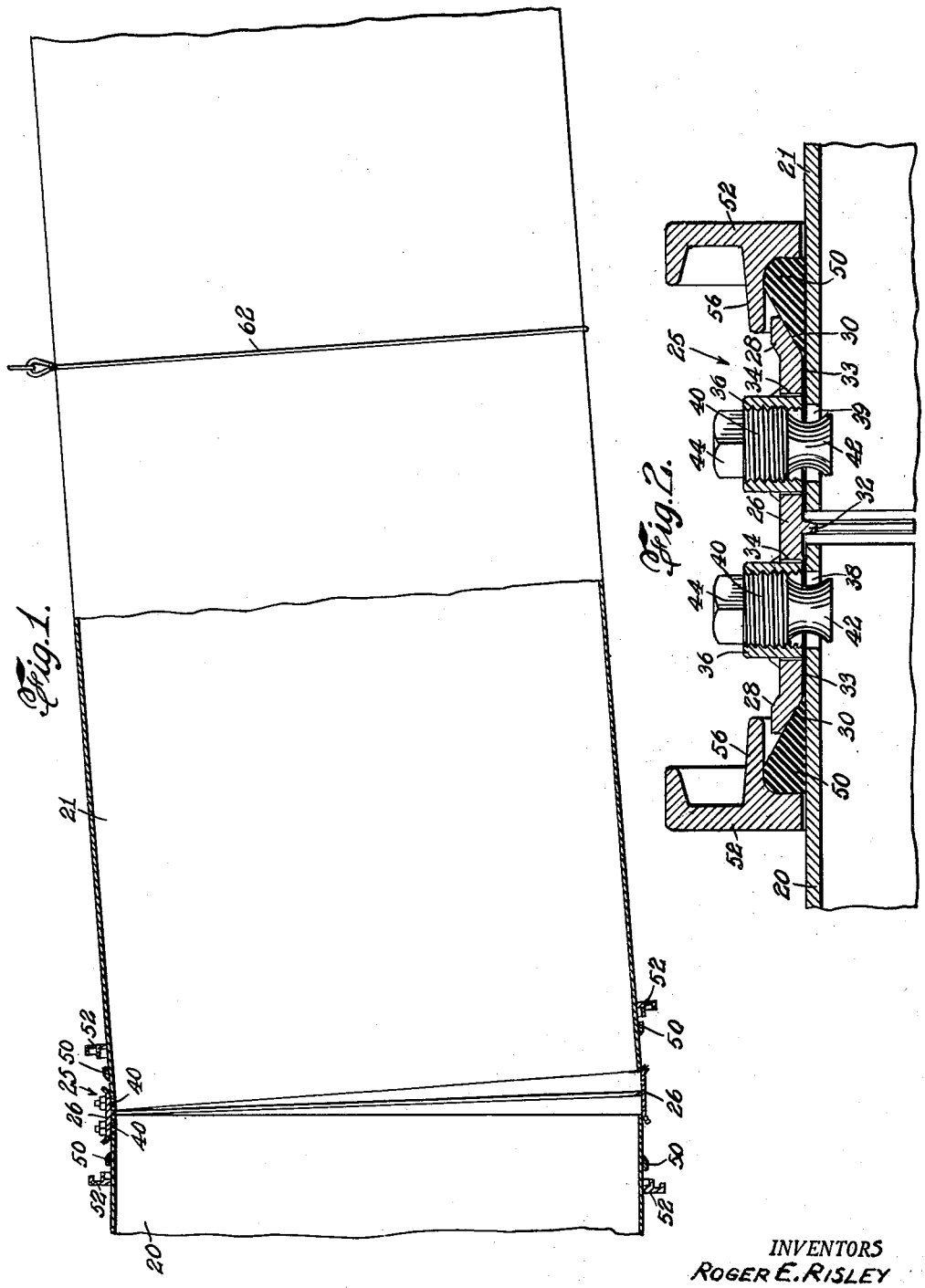
INVENTORS
ROGER E. RISLEY
BY AND GEORGE D. KISH
ATTORNEY.

Feb. 4, 1958 R. E. RISLEY ET AL 2,822,191
PIPE COUPLING WITH PIPE ENGAGING PIVOT LUGS
Filed July 11, 1952 3 Sheets-Sheet 2
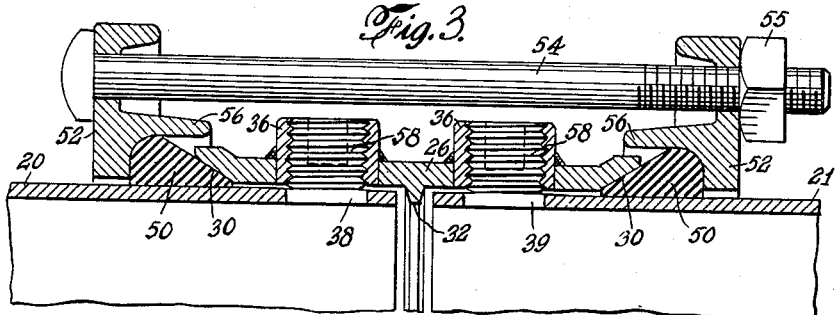
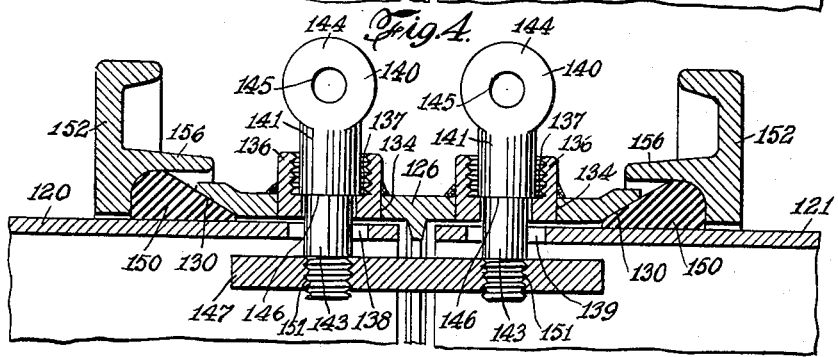
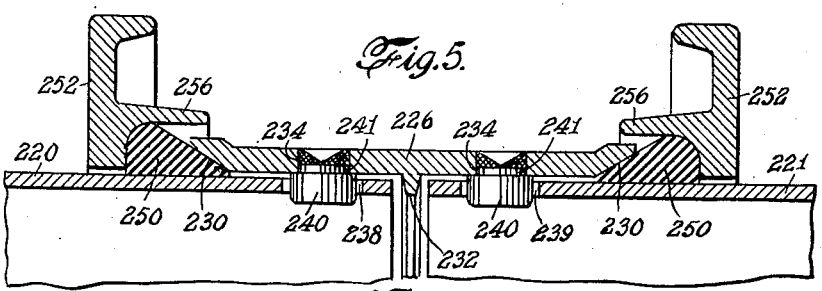
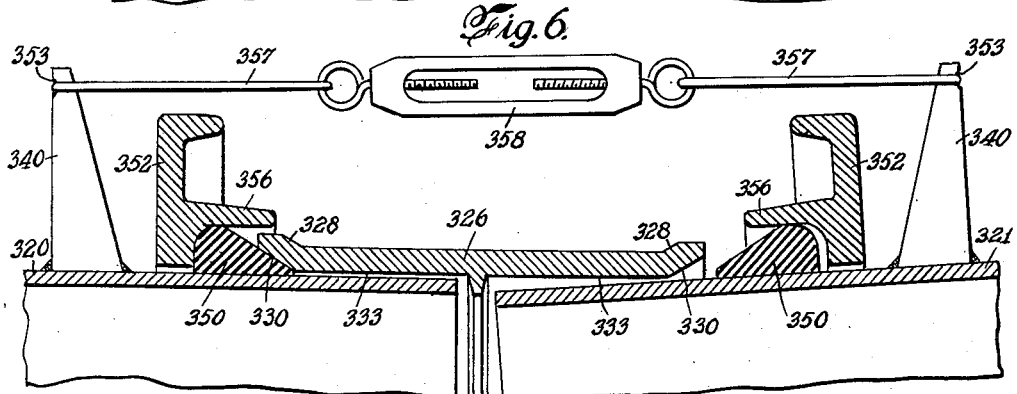
INVENTORS
ROGER E. RISLEY
AND GEORGE D. KISH
BY
ATTORNEY.

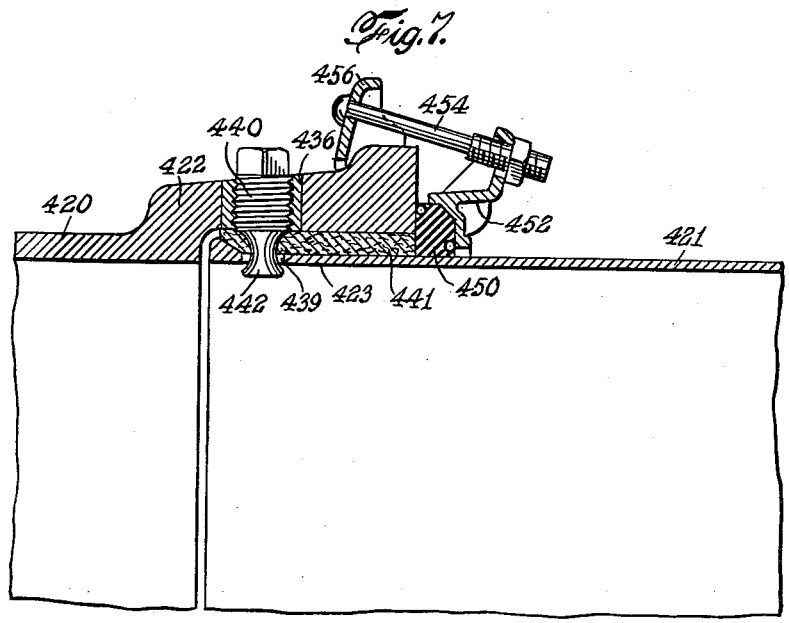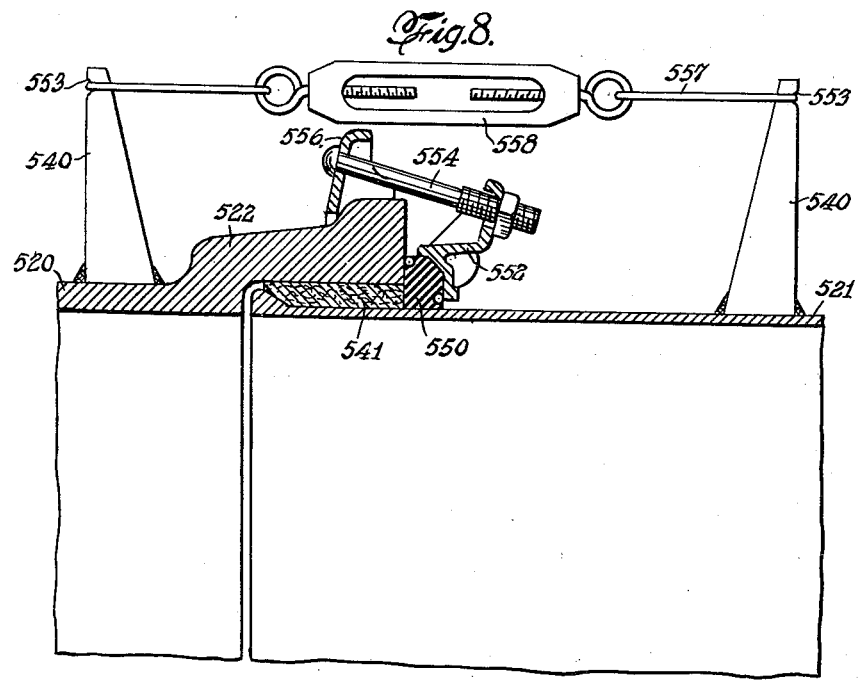

United States Patent Office 2,822,191
Patented Feb. 4, 1958

2,822,191

PIPE COUPLING WITH PIPE ENGAGING PIVOT LUGS

Roger E. Risley and George D. Kish, Bradford, Pa., assignors to Dresser Industries, Inc., a corporation of Delaware Application July 11, 1952, Serial No. 298,295

3 Claims. (Cl. 285—18)

This invention relates to pipe couplings and while not necessarily restricted thereto is more particularly concerned with pipe couplings for large diameter pipes.

Long-distance pipe lines for the transmission of oil, water, gas and like fluids are customarily formed from a plurality of sections of steel pipe interconnected by coupling means which provide a fluid-tight seal between the pipe sections but at the same time provide a sufficiently flexible joint to accommodate the expansion and contraction of the line under the conditions of service. The couplings commonly in use for this purpose consist of tubular sleeves or "middle rings" which are slipped over the ends of the adjacent longitudinally aligned pipe sections to bridge the gap between the pipe sections, and "followers" which are positioned around the pipe sections on each side of the middle ring and are drawn against the ends of the middle ring by means of bolts which engage the middle ring or extend between the followers at each end of the middle ring. Suitable gaskets are placed at the ends of the middle rings and these gaskets are compressed by the action of the followers when drawn up by the bolts to provide a fluid-tight seal between the middle ring and the exterior surface of the pipe sections.

Pipe lines of this type may be placed underground or on the surface of the ground or both and in laying the pipe line it is customary to "stab" the ends of the pipe sections into a coupling and then to tighten the bolts to compress the gaskets to provide the desired fluid-tight seal. While this operation is readily effected with relative ease in the laying of pipe lines with small diameter pipe, special problems arise when an attempt is made to employ conventional methods in the laying of so-called large diameter pipe, i. e. pipe having a diameter of 24 inches or more. Such large diameter pipe is bulky and somewhat difficult to handle and is also relatively heavy. Considerable difficulty is experienced in the field, therefore, in obtaining proper entrance of the ends of the pipe sections into the couplings, especially when the pipe end and the coupling come together with a relatively tight fit by reason of reduced clearances or irregularities in surface curvature of the pipe section. The difficulty is particularly great when the pipe is to be laid underground. In laying pipe underground, a deep trench is dug, the pipe sections are laid in the trench and coupled and the pipe line is then covered with back fill. Because of the time and labor involved in digging the trench, the size of the trench is held to a minimum consistent with efficient laying of the pipe. Ordinarily, the size of the trench makes it difficult to maneuver the pipe once it has been lowered into the trench. When, therefore, in the case of large diameter pipe it is necessary to move the pipe longitudinally to effect entrance into the coupling, much time and effort must be expended and the rate of laying the pipe is low.

Similar problems arise when the pipe sections employed are of the so-called bell and spigot type, each pipe section having a bell end for receiving the plain or "spigot" end of an adjacent pipe section.

This problem has been recognized in the industry for many years and various proposals have been made for facilitating the laying of large diameter pipe. Such prior proposals, however, have generally involved complicated and expensive structures or the use of special rigs or appliances. These arrangements have not only led to an increase in the cost of pipe laying but have required skilled labor in their use and have thus increased the labor cost per unit length of pipe laid. These prior arrangements have also not been entirely satisfactory from a practical viewpoint and it is generally recognized that the laying of large diameter pipe lines still presents a serious problem from the standpoint of speed and efficiency.

It is a principal object of the present invention to provide means for facilitating and accelerating the laying and coupling of pipe lines, particularly pipe lines formed from large diameter pipe, particularly when the pipe sections and couplings come together with a relatively tight fit.

It is another object of the invention to provide pipe laying and coupling means of the character indicated which insure proper positioning of the pipe sections relative to one another even when a pipe line is laid underground.

It is a further object of the invention to provide means for facilitating the laying of large diameter pipe lines which do not require the use of skilled labor.

It is another object of the invention to provide an improved coupling for use in the construction of pipe lines.

It is a further object of the invention to provide coupling means of the type described which are economical to manufacture and use.

It is a still further object of the invention to provide coupling means for pipe sections which avoid the drawbacks and deficiencies of pipe coupling means heretofore proposed.

In accordance with the invention, there is provided a pipe coupling construction comprising a pipe end receiving member separate from or integral with a section of pipe, and cooperating follower members for compressing gaskets in gasket recesses formed at the end of the member. The ends of the pipe sections to be coupled are adapted to be pivoted into aligned position and means are provided in accordance with the invention for at least temporarily interconnecting the pipe sections or connecting the pipe sections to the pipe end receiving member at one point of the pipe section circumference.

In accordance with a preferred embodiment of the invention, the pipe end receiving member comprises a tubular sleeve or middle ring adapted to receive an end of the pipe sections to be coupled and this middle ring is provided with pins extending radially inwardly into the interior of the middle ring and cooperating with suitable apertures in the ends of the pipe sections for holding a portion of the pipe section in fixed position while permitting the remainder of the pipe section to pivot about a portion of the middle ring as a fulcrum.

It is a feature of the invention that the means for holding the pipe section for pivotal movement into the middle ring do not affect the fluid-tightness of the coupling when installed.

It is another feature of the invention that the means for pivoting the pipe sections are free from complicated constructional features and may be effectively utilized even by unskilled labor.

Other objects and features of the invention will be readily apparent from the following detailed description thereof and from the drawings in which are shown illustrative embodiments of practical applications of the invention.

In the drawings,

Fig. 1 is a longitudinal sectional view of a portion of a pipe line formed from large diameter pipe, showing a construction embodying features of the present invention;

Fig. 2 is a sectional view on an enlarged scale of the coupling construction shown in Fig. 1 after the pipe sections have been inserted into the coupling;

Fig. 3 is a similar view showing the completely assembled pipe and coupling construction;

Fig. 4 is a partial sectional view of another embodiment of the invention showing a modified form of the pipe holding means;

Fig. 5 is a similar view of another embodiment of the invention;

Fig. 6 is a further embodiment of the invention wherein portions of the pipe holding means are directly connected to the pipe sections;

Fig. 7 is a fragmentary sectional view showing the application of the invention to large diameter pipe of the bell and spigot type, and Fig. 8 is a similar view of another embodiment of the invention involving bell and spigot pipe sections.

Referring to the drawings, and more particularly to Figs. 1 and 2, there are shown the ends of two pipe sections 20 and 21 being connected to form a pipe line. The ends of the pipe sections 20 and 21 are inserted in a pipe coupling designated generally by the reference numeral 25 and comprising a tubular sleeve or middle ring 26 having flared ends 28 defining annular gasket recesses 30 and having an inwardly extended radial rib 32 serving as a pipe stop for preventing the ends of the pipe sections from being inserted too far into the middle ring. The inner ends of the gasket recesses define annular pipe apertures 33.

In accordance with the invention, the middle ring 26 is formed with two axially spaced-apart apertures 34 on each side of the pipe stop 32 and in these apertures are positioned and secured, as by welding, two internally-threaded socket members 36. The pipe sections 20 and 21 are provided with apertures 38 and 39, respectively, which are in substantial alignment with the socket members 36 when the pipe sections 20 and 21 are in the positions shown in Figs. 1 and 2. Threadedly engaged in the socket members 36 are pivot pins 40 which, in the embodiment illustrated, have inner ends 42 extending through the apertures 38 and 39 in the pipe sections. The outer ends of the pivot pins 40 are formed with heads 44 shaped to receive a wrench or other tool for engaging the pins to move them radially inwardly or outwardly.

To connect pipe sections 20 and 21 with coupling 25 in accordance with the invention and as shown in Fig. 1, the middle ring 26 is first slipped over the end of pipe section 20 with the left-hand socket member 36 in alignment with the aperture 38 in the pipe section. The pivot pin 40 is then screwed into the member 36 until the end 42 passes through the aperture 38, as shown in Fig. 2. This locks the middle ring 26 to the pipe section 20, permitting only limited axial displacement. The end of the pipe section 21 is then lowered into position with its upper end portion entering into middle ring 26 as shown in Fig. 1 with the aperture 39 in the pipe section disposed below the right-hand socket member 36. The right-hand pivot pin 40 is then screwed into the socket member 36 until its end portion 42 passes through the aperture 39. This locks pipe section 21 in the middle ring 26 but permits the pipe section 21 to pivot freely about the surface of the pipe aperture 33 as a fulcrum. The pipe section 21 is then lowered into a horizontal position and pivoting of the pipe end about the pipe aperture 33 automatically causes the pipe section to enter the middle ring 26 in alignment with the pipe section 20.

A fluid-tight connection between the middle ring 26 and the pipe sections 20 and 21 is then effected. For this purpose there are provided annular gaskets 50 and followers 52. The annular gaskets 50 are formed from rubber or rubber composition, this term being used generically to include natural and synthetic rubbers and elastomeric compounds, or compositions having like properties and characteristics. The material is relatively firm and solid but sufficiently resilient and elastic to flow under pressure to conform to the surfaces between which it is confined. The gaskets 50 may be continuous annular members or may be split, to facilitate installation, with abutting or tapered over-lapping ends.

The gaskets 50 are axially compressed and radially expanded into sealing engagement with the outer surface of the pipe sections and the adjacent surfaces of the gasket recesses 30 by the followers 52 which, like the gaskets 50, may be unitary annular members or may be formed from two or more sections with abutting or over-lapping ends. The followers are provided with a plurality of peripherially spaced apertures which receive bolts 54 having nuts 55 for drawing the followers together. Each follower 52 has an inwardly-directed axial flange 56 which overlies the adjacent gasket 50 and serves to confine it against the pipe.

As shown in Fig. 1, the gaskets 50 and the followers 52 are advantageously placed on the pipe sections 20 and 21 before the pipe sections are inserted into middle ring 26 and, after the pipe sections have been brought into horizontal alignment, the followers and gaskets are moved against the middle ring and the followers are drawn up by the bolts 54 and nuts 55 to compress the gaskets and effect the necessary fluid-tight seal.

The pivot pins 40 may be left in place at the end of the coupling operation as shown in Fig. 2, being tightened to the necessary extent and being provided with any convenient sealing compound used in pipe coupling to effect a fluid-tight closure for the socket members 36. Preferably, however, the pivot pins 40 are removed and replaced by plugs 58, as shown in Fig. 3. This has the advantage of permitting free outward longitudinal movement of the pipe sections 20 and 21 inside the coupling to compensate for contraction forces. The pivot pins, when extending through the apertures 38 and 39 in the pipe sections, tend to restrict such outward longitudinal movement of the pipe sections and when the installation is such that substantial contraction forces are likely to be encountered, such restriction is disadvantageous.

It will be apparent that the structure shown in Figs. 1, 2 and 3 may be modified without departing from the characteristic structural features of the invention. Fig. 4, for example, shows another embodiment in which the pivot pins have a somewhat modified construction. Thus, referring to Fig. 4, wherein parts corresponding to those shown in Figs. 1, 2 and 3 have been given the same reference numerals to which 100 has been added, there are shown pipe sections 120 and 121 having apertures 138 and 139. Middle ring 126 is formed with apertures 134 in which are positioned internally-threaded socket members 136. Unlike the socket members 36, the members 136 are threaded along only a portion of their length and at their inner ends are provided with annular shoulders 137. Positioned in socket members 136 are pivot pins 140 having an upper shank portion 141 and a lower shank portion 143 of lesser diameter and externally threaded at its ends. The difference in diameter between the shank portion 141 and 143 provides a shoulder 146 on the pivot pins which engages the shoulder 137 and limits inward radial movement of the pins. The pins 140 have head portions 144 which are constructed to facilitate rotation of the pins with a wrench, a rod inserted through the apertures 145, or like tool.

While the pivot pins 140 may be used in the arrangement described, advantageously pivotal movement of the pins is restrained by means of a bar 147 which is provided with threaded apertures 151 into which the threaded ends of the shanks 143 are screwed. Thus, after the pipe ends have been initially brought together in the coupling sleeve in the preliminary position shown in Fig. 1, the pins 140 are passed through the apertures in the pipe ends and engaged with the bar 147. After the pipe sections 120 and 121 have then been brought into axial alignment in the middle ring 126, the pivot pins 140 are unscrewed and removed, allowing the bar 147 to fall into the pipe, and the socket members 136 are closed by plugs such as the plugs 58 shown in Fig. 3.

In another embodiment of the invention, shown in Fig. 5, non-removable pivot pins are provided. This type of structure is advantageous in installations where axial forces due to expansion and contraction of the pipe line are slight. Thus, as shown in Fig. 5, wherein parts corresponding to those shown in Figs. 1, 2 and 3 have been given the same reference numerals to which 200 has been added, the middle ring 226 is provided on its inner surface with pivot pins 240 which have shank portions 241 fixedly secured in apertures 234. Pivot pins 240 are positioned to extend through apertures 238 and 239 in pipe sections 220 and 221, respectively.

In another embodiment of the invention, the pivot pins are not provided in the coupling middle ring as shown in Figs. 1 to 5, but are positioned on the pipe sections themselves at points adjacent their ends. Referring, for example, to Fig. 6, wherein parts corresponding to those shown in Figs. 1, 2 and 3 have been given the same reference numerals to which 300 has been added, there are shown pipe sections 320 and 321 positioned in a cylindrical middle ring 326. Near the opposed ends of the pipe sections and axially beyond the followers 352, pivot pins 340 are fixedly secured, as by welding, to the external surface of the pipe sections. The pivot pins 340, which are formed with a notch or groove 353 on the side opposite the adjacent free pipe end, are temporarily connected during installation of the pipes and entry of the pipe section 321 into the middle ring 326 by means of a non-expansible connecting member. This connecting member, in the embodiment illustrated, is a cable 357 having end portions looped about the pivot pins and engaged in the grooves 353, and interconnected by a turn-buckle 358. The cable and turn-buckle connecting member limits outward axial movement of the pipe sections, and when the pipe section 321 is lowered into horizontal alignment with pipe section 320 it pivots freely into place as shown in Fig. 6, the surface of the pipe section pivoting about the pipe aperture 333 as a fulcrum. It will be apparent that the connecting member may take other forms than that specifically shown in the embodiment illustrated in Fig. 6. For example, it may comprise a chain, or a cable without a turn-buckle, or other like means.

In the foregoing description, reference has been made to the lowering of one pipe section into axial alignment with the first laid pipe section during which the second pipe section pivots into position into the middle ring of the coupling which is to connect the two pipe sections. The lowering of the pipe section into the trench is effected by any convenient means. Sections of large diameter pipe are relatively heavy and mechanical assistance is generally required. As shown in Fig. 1, for example, a cable sling arrangement including a looped portion 62 is connected to a winch, not shown, or other suitable mechanical reeling means. The pipe section may, of course, also be lowered by a block and fall or the like, and manually guided longitudinally into the coupling middle ring. In any case, however, the end of the pipe section is introduced into the coupling sleeve at an angle, as shown in Fig. 1, with the upper portion of the pipe end extending a greater distance into the sleeve than the lower end. The two pipe sections are then restrained against longitudinal movement by any of the means hereinbefore described and the inclined pipe section is gradually lowered and automatically directed into horizontal alignment with the horizontal pipe section.

While the invention has been above described in terms of so-called plain end pipe, the invention is, as previously mentioned, equally applicable to bell and spigot pipe wherein the end of one pipe section is received into the bell of an adjacent pipe section when the two pipe sections are brought into axial alignment, without the use of a coupling sleeve. This type of construction is illustrated by way of example in Figs. 7 and 8 which show the coupling of two bell and spigot pipe sections by means embodying features of the invention.

Referring more particularly to Fig. 7, wherein parts corresponding to those shown in Figs. 1 and 2 have been given the same reference numerals to which 400 has been added, there is shown a pipe section 420 having a bell end 422 in which is received the spigot end 423 of adjacent pipe section 421.

The spigot end of the pipe section 421 is formed with an aperture 439. In alignment with the aperture 439, when the two pipe sections are in the position shown in Fig. 7, the bell end 422 of pipe section 420 is provided with an internally-threaded socket member 436 in which is threadedly engaged a removable pivot pin 440 having a lower end portion 442 which extends through the aperture 439 for holding the pipe sections in mutual axial relationship but permitting pivotal movement of pipe section 421 relative to the bell end 422. By means of this arrangement, the two pipe sections are brought into axial alignment in the manner above described in connection with the embodiments of Figs. 1 and 2, i. e. the pipe section 421 is angularly engaged, by the cooperating action of the pivot pin with aperture 439, and the free end of the pipe section 421 is lowered into a horizontal position. As in the case of the embodiment of Figs. 1 and 2, the pivot pin 440 may be left in position after the pipes have been coupled or it may be removed and replaced by a suitable plug.

After the pipe sections have been placed in the desired aligned position, the annular space between the outer surface of spigot end 423 and the inner surface of bell end 422 is packed with caulking material 441 and this caulking material is held in position against displacement by the pressure of the fluid flowing through the pipe line by a gasket 450 held in position by a follower 452, which is drawn toward the bell end by means of bolts 454 cooperating with an anchor ring 456. The construction comprising the gasket 450, the follower 452 and the associated clamping means is not per se part of the present invention and may take any convenient form. The construction illustrated in Fig. 7 is that disclosed in detail in copending application Serial No. 253,235, filed October 26, 1951, and is particularly suitable for this type of installation.

It will be apparent that in the embodiment of Fig. 7 the socket and pivot pin arrangement may be modified to correspond to the sockets and pivot pins shown in Figs. 3 and 4.

In Fig. 8 there is shown a bell and spigot pipe construction provided with the pivoting arrangement shown in Fig. 6. Thus, as shown, the pipe sections 520 and 521 are provided with pivot pins 540 secured, as by welding, to the surface of the pipe sections. During the coupling of the pipe sections, these sections are held against outward axial movement by a connecting member comprising a cable 557 having end portions looped about pivot pins and engaged in the grooves 553 of the pins 540, the cable ends being connected by a turnbuckle 558. As in the embodiment illustrated in Fig. 6, the connecting member between the pivot pins may take forms other than that specifically shown in Fig. 8. For example, it may comprise a chain, or a cable without a turnbuckle, or other like means.

In accordance with the invention there is thus provided a construction which greatly facilitates the laying of large diameter pipe lines and permits such lines to be laid rapidly and accurately by relatively unskilled labor.

It will be obvious that various other changes and modifications may be made without departing from the scope of the invention as defined in the appended claims and it is intended, therefore, that all matter contained in the foregoing description and in the drawings shall be interpreted as illustrative and not in a limiting sense.

What we claim and desire to secure by Letters Patent is:

1. In a large diameter pipe line including a tubular pipe coupling member, a thin-walled first pipe section, and a thin-walled second pipe section, the diameter of each of said pipe sections being substantially greater than the axial dimension of said coupling member, said coupling member having an internal diameter slightly greater than the external diameter of said pipe sections and said member including means for preventing each of said pipe sections from entering into said member for a distance greater than about half its axial dimension, and external means for providing fluid-tightness between said coupling member and said pipe sections, said external means comprising an external gasket and annular follower means for urging the gasket axially toward the ends of said tubular coupling member, and a construction for facilitating the coupling of said sections of large diameter pipe when the ends of said sections are introduced into ends of said tubular coupling member to provide said pipe line having said pipe sections in axially-aligned relationship, said construction comprising pivoting means for pivotally interrelating said first pipe section to said second pipe section having its end portion disposed in said tubular coupling member without direct interengagement of said pipe sections with each other, said means comprising pins positioned in said coupling member and engageable with apertures formed in a portion of the ends of the two adjacent pipe sections to hold said portions of the pipe sections in predetermined spaced-apart relationship while permitting the remainder of the pipe sections to pivot about said portions and thereby to effect entrance of said second pipe section into said coupling member in axial alignment with said first pipe section, said first pipe section being engageable with said locking means with the portion of said first pipe section adjacent said locking means being inserted in one axial half of said coupling member substantially half the axial length of said member while the diametrically-opposite portion of said first pipe section is only slightly engaged in said member, and said second pipe section being similarly engageable with said pivoting means and being similarly receivable in the other axial half of said coupling member, whereby upon pivoting movement of said second pipe section about said pivoting means to cause said diametrically opposite portions of said pipe sections to move toward each other, the ends of said pipe sections will be moved into said coupling member and any deviations from the circular in the circumference of said pipe sections will be compelled to conform to the internal curvature of said coupling member, said apertures having an axial length substantially greater than the diameter of said pins at said apertures whereby said pins do not impede normal axial movements of said pipe sections in service and said pins being positioned sufficiently close to the ends of said coupling member to engage in the apertures in said pipe sections when the end edges of said pipe sections are only partially inserted in said coupling member.

2. In a large diameter pipe line including a tubular pipe coupling member, a thin-walled first pipe section, and a thin-walled second pipe section, the diameter of each of said pipe sections being substantially greater than the axial dimension of said coupling member, said coupling member having an internal diameter slightly greater than the external diameter of said pipe sections and said member including means for preventing each of said pipe sections from entering into said member for a distance greater than about half its axial dimension, and external means for providing fluid-tightness between said coupling member and said pipe sections, said external means comprising an external gasket and annular follower means for urging the gasket axially toward the ends of said tubular coupling member, and a construction for facilitating the coupling of said sections of large diameter pipe when the ends of said sections are introduced into the ends of said tubular coupling member to provide said pipe line having said pipe sections in axially-aligned relationship, said construction comprising pivoting means for pivotally interrelating said first pipe section to said second pipe section having its end portion disposed in said tubular coupling member without direct interengagement of said pipe sections with each other, said means comprising pins positioned in said coupling member and engageable with apertures formed in a portion of the ends of the two adjacent pipe sections to hold said portions of the pipe sections in predetermined spaced-apart relationship while permitting the remainder of the pipe sections to pivot about said portions and thereby to effect entrance of said second pipe section into said coupling member in axial alignment with said first pipe section, said first pipe section being engageable with said locking means with the portion of said first pipe section adjacent said locking means being inserted in one axial half of said coupling member substantially half the axial length of said member while the diametrically-opposite portion of said first pipe section is only slightly engaged in said member, and said second pipe section being similarly engageable with said pivoting means and being similarly receivable in the other axial half of said coupling member, whereby upon pivoting movement of said second pipe section about said pivoting means to cause said diametrically opposite portions of said pipe sections to move toward each other, the ends of said pipe sections will be moved into said coupling member and any deviations from the circular in the circumference of said pipe sections will be compelled to conform to the internal curvature of said coupling member, said pins being removably positioned whereby they may be removed after axial alignment of said pipe sections and free axial movements of the pipe sections in service is not impeded and said pins being positioned sufficiently close to the ends of said coupling member to engage in the apertures in said pipe sections when the end edges of said pipe sections are only partially inserted in said coupling member.

3. In a large diameter pipe line including a tubular pipe coupling member, a thin-walled first pipe section, and a thin-walled second pipe section, the diameter of each of said pipe sections being substantially greater than the axial dimension of said coupling member, said coupling member having an internal diameter slightly greater than the external diameter of said pipe sections and said member including means for preventing each of said pipe sections from entering into said member for a distance greater than about half its axial dimension, and external means for providing fluid-tightness between said coupling member and said pipe sections, said external means comprising an external gasket and annular follower means for urging the gasket axially toward the ends of said tubular coupling member, and a construction for facilitating the coupling of said sections of large diameter pipe when the ends of said sections are introduced into the ends of said tubular coupling member to provide said pipe line having said pipe sections in axially-aligned relationship with each other, said construction comprising pivoting means for pivotally inter-relating said first pipe section to said second pipe section having its end portion disposed in said tubular coupling member without direct interengagement of said pipe sections, said means comprising pins positioned in said coupling member and engageable with apertures formed in a portion of the ends of the two adjacent pipe sections to hold said portions of the pipe sections in predetermined spaced-apart relationship while permitting the remainder of the pipe sections to pivot about said portions and thereby to effect entrance of said second pipe section into said coupling member in axial alignment with said first pipe section, said first pipe section being engageable with said locking means with the portion of said first pipe section adjacent said locking means being inserted in one axial half of said coupling member substantially half the axial length of said member while the diametrically-opposite portion of said first pipe section is only slightly engaged in said member, and said second pipe section being similarly engageable with said pivoting means and being similarly receivable in the other axial half of said coupling member, whereby upon pivoting movement of said second pipe section about said pivoting means to cause said diametrically-opposite portions of said pipe sections to move toward each other, the ends of said pipe sections will be moved into said coupling member and any deviations from the circular in the circumference of said pipe sections will be compelled to conform to the internal curvature of said coupling member, said apertures having an axial length substantially greater than the diameter of said pins at said apertures whereby said pins do not impede normal axial movements of said pipe sections in service and said pins being positioned sufficiently close to the ends of said coupling member to engage in the apertures in said pipe sections when the end edge of said pipe sections are only partially inserted in said coupling member, and a link member interconnecting said pins interiorly of said pipe sections.

References Cited in the file of this patent

UNITED STATES PATENTS

| | | |
|---|---|---|
| 552,319 | Farrey | Dec. 31, 1895 |
| 1,620,094 | Gillick | Mar. 8, 1927 |
| 1,853,168 | Murphy | Apr. 12, 1932 |
| 1,904,967 | Barder | Apr. 18, 1933 |
| 2,272,515 | Deacon | Feb. 10, 1942 |

FOREIGN PATENTS

| | | |
|---|---|---|
| 2,765 | Great Britain | Feb. 3, 1911 |
| 422,052 | Germany | July 11, 1924 |
| 285,766 | Italy | May 21, 1931 |